(12) United States Patent
Combes et al.

(10) Patent No.: US 8,727,268 B2
(45) Date of Patent: May 20, 2014

(54) ATTACHMENT DEVICE FOR AIRCRAFT ENGINE AND AIRCRAFT COMPRISING AT LEAST ONE SUCH DEVICE

(75) Inventors: Stephane Combes, Buzet sur Tarn (FR); Didier Rovatti, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 1183 days.

(21) Appl. No.: 12/664,256

(22) PCT Filed: Jun. 19, 2008

(86) PCT No.: PCT/EP2008/057786
§ 371 (c)(1),
(2), (4) Date: Dec. 11, 2009

(87) PCT Pub. No.: WO2008/155386
PCT Pub. Date: Dec. 24, 2008

(65) Prior Publication Data
US 2010/0181417 A1    Jul. 22, 2010

(30) Foreign Application Priority Data
Jun. 21, 2007 (FR) ..................... 07 55937

(51) Int. Cl.
*B64D 27/00* (2006.01)
(52) U.S. Cl.
USPC ......................................................... 244/54
(58) Field of Classification Search
USPC ............... 244/53 R, 54, 55; 248/554; 403/52, 403/109.6, 161; 60/796
See application file for complete search history.

(56) References Cited

U.S. PATENT DOCUMENTS

| | | | | |
|---|---|---|---|---|
| 3,844,115 A | * | 10/1974 | Freid | 60/797 |
| 5,320,307 A | * | 6/1994 | Spofford et al. | 244/54 |
| 5,873,547 A | * | 2/1999 | Dunstan | 244/54 |
| 6,328,293 B1 | * | 12/2001 | Olsen | 267/140.11 |
| 6,494,403 B2 | * | 12/2002 | Jule et al. | 244/54 |
| 6,758,438 B2 | * | 7/2004 | Brefort et al. | 244/54 |

(Continued)

FOREIGN PATENT DOCUMENTS

| | | |
|---|---|---|
| EP | 0 564 126 A1 | 10/1993 |
| EP | 1 103 463 A1 | 5/2001 |
| EP | 1 157 925 A2 | 11/2001 |
| FR | 2 887 850 | 1/2007 |

OTHER PUBLICATIONS

U.S. Appl. No. 12/594,455, filed Oct. 2, 2009, Combes, et al.
U.S. Appl. No. 12/596,555, filed Oct. 19, 2009, Combes, et al.

(Continued)

*Primary Examiner* — Valentina Xavier
(74) *Attorney, Agent, or Firm* — Oblon, Spivak, McClelland, Maier & Neustadt, L.L.P.

(57) ABSTRACT

An attachment device for an aircraft engine including a rigid structure and an attachment mechanism of the engine onto the rigid structure. The attachment mechanism includes two thrust take-up connecting rods mechanically connected to a spreader, a connection fitting fixed to the rigid structure to which the spreader is mechanically connected by a junction fitting by a connection pin, and an additional fitting to which the connecting rods, the spreader, and the connection fitting are mechanically connected. A clearance is provided at the mechanical link between the connecting rods and the additional fitting, the link between the additional fitting and the connection fitting being made using the connection pin being inserted laterally, orthogonal to the median plane of the attachment device.

10 Claims, 5 Drawing Sheets

(56) References Cited

U.S. PATENT DOCUMENTS

| | | | |
|---|---|---|---|
| 6,843,449 B1 * | 1/2005 | Manteiga et al. | 244/54 |
| 7,021,585 B2 * | 4/2006 | Loewenstein et al. | 244/54 |
| 7,607,609 B2 * | 10/2009 | Levert | 244/54 |
| 8,146,856 B2 * | 4/2012 | Combes et al. | 244/54 |
| 8,322,651 B2 * | 12/2012 | Levert et al. | 244/54 |
| 8,322,652 B1 * | 12/2012 | Stretton | 244/54 |
| 2005/0067528 A1 * | 3/2005 | Loewenstein et al. | 244/54 |
| 2010/0127118 A1 * | 5/2010 | Combes et al. | 244/54 |
| 2010/0181417 A1 | 7/2010 | Combes et al. | |

OTHER PUBLICATIONS

U.S. Appl. No. 13/078,593, filed Apr. 1, 2011, Combes, et al.

* cited by examiner

ATTACHMENT DEVICE FOR AIRCRAFT ENGINE AND AIRCRAFT COMPRISING AT LEAST ONE SUCH DEVICE

TECHNICAL FIELD AND PRIOR ART

This invention relates in general to a device for attachment of an aircraft engine, for example designed to be inserted between an aircraft wing and the engine concerned, and an engine assembly comprising such an attachment device.

The invention may be used on any aircraft type equipped with turbojets or turboprops.

This type of attachment device, also called an EMS (Engine Mounting Structure), may indifferently be used to suspend an engine below the aircraft wing, to mount this engine above this same wing, or to fix this engine to the aft part of the aircraft fuselage.

Such an attachment device is designed to form the connecting interface between a turboengine and an aircraft wing. It transmits forces generated by its associated turboengine to the structure of this aircraft, and it also enables routing of fuel, electrical, hydraulic and air systems between the engine and the aircraft.

In order to transmit forces, the attachment device comprises a rigid structure called the primary structure, often a "box" type structure, in other words that is formed by the assembly of upper and lower spars and side panels connected to each other through transverse ribs.

The device is also provided with attachment means inserted between the turboengine and the rigid structure, these means globally comprising two engine attachments, and a device to take up thrusts generated by the turboengine.

In prior art, this take-up device for example includes two lateral connecting rods connected firstly to the turboengine casing and secondly added onto a spreader itself articulated onto the rigid structure of the attachment device.

Similarly, the attachment device also comprises another series of attachments forming an assembly system inserted between the rigid structure and the wing of the aircraft, this system commonly being composed of two or three attachments.

Finally, the pylon is provided with a secondary structure for segregation and holding systems in place, while supporting the aerodynamic fairings.

As mentioned above, in solutions proposed in the past, the thrust force take-up device includes a spreader articulated on the rigid structure through a connection pin. The spreader is normally composed of two superposed fittings, and the connection pin is doubled up, to assure a so-called "Fail-Safe" function for the transmission of forces along the longitudinal direction. Thus, if one of the two superposed fittings forming the spreader fails, the other fitting will resist the forces from the lateral connecting rods all by itself, and if the outer pin of the pair of connection pins should break, the inner pin will take over to resist and transmit these forces along the longitudinal direction.

Attachment devices are known in which the aft engine attachment and the force take-up device are separate and are offset in the longitudinal direction. The attachment of the engine to the lower spar of the box is made through a pin fixed to the engine and passing through the spar. This pin orthogonal to the plane of the thrust connecting rods is usually inclined relative to the vertical direction. This inclination makes mounting complex and makes it necessary to use special tooling to enable such an attachment.

Furthermore, some aircraft engines have relatively large outside diameters relative to the conventional engine diameters. This makes it necessary to bring the engine as close as possible to the wing to reduce ground clearance impacts. Reducing this separation distance makes it more difficult to use special tooling.

Document FR 2 887 850 discloses one force take-up device in which the fail-safe function is obtained particularly by means of stops provided forward from the force take-up device, the stops being fixed directly onto the box. The box width is relatively narrow in some applications, and is too narrow for the attachment of such stops. Two superposed spreaders are also provided, a first spreader to resist thrust during normal operation, and a second spreader to resist thrust in case the first spreader should fail.

Consequently, one purpose of this invention is to offer an attachment device comprising an engine thrust take-up device with a pylon performing the fail safe function, i.e. redundancy of thrust take-up, compact and reduced mass to enable simple and close up attachment of the engine onto the pylon.

PRESENTATION OF THE INVENTION

The purpose mentioned above is achieved using an engine attachment device for an aircraft comprising a force take-up device comprising two connecting rods connected to a spreader connected by an intermediate fitting to a fitting fixed on the pylon and a redundant fitting covering the spreader and the intermediate fitting and connected to the spreader and the fitting fixed on the box, and connected directly with clearance to the connecting rods, the connection between the fitting fixed on the box and the intermediate fitting and the redundant fitting be made by inserting a pin laterally.

In other words, the device comprises a single additional fitting capable of transmitting thrusts directly to a fitting fixed onto the box in case a connecting rod or the spreader should break.

The stop fittings are eliminated, which then eliminates the need for take-up points inside the pylon box, which gives a significant saving of mass. A very thin pylon can be used.

The main purpose of this invention is then an aircraft engine attachment device comprising a rigid structure and means of attaching said engine onto said rigid structure, said attachment means comprising a device to take up thrust forces generated by the engine, said thrust take-up device comprising two connecting rods mechanically connected to a spreader at an aft end through a first mechanical link, a connection fitting fixed to the rigid structure to which the spreader is mechanically connected by a junction fitting by means of a connection pin inserted orthogonal to a vertical and longitudinal median plane of the attachment device, an additional fitting to which the spreader and the connection fitting are mechanically connected through the connecting rods, a clearance being provided at the mechanical link between the connecting rods and the additional fitting, the link between the additional fitting and the connection fitting being made using a connection pin connecting the connection fitting and the junction fitting, said connection pin being inserted laterally, orthogonal to said median plane of the attachment device.

The connection pin mechanically connecting the junction fitting and the connection fitting and the connection pin mechanically connecting the additional fitting and the junction fitting are advantageously coincident, which further simplifies the device and its installation.

The junction fitting may comprise a plate mechanically connected to the spreader through a connection pin at a first longitudinal end, and a clevis into which the connection fitting will fit at a second longitudinal end.

In one example embodiment, each of the connecting rods is mechanically connected to the spreader through a connection pin, the additional fitting comprises a first clevis into which the aft ends of the connecting rods and the spreader fit, of which the two branches comprise bores to hold the ends of the connection pins connecting the connecting rods to the spreader and the connection pin connecting the spreader to the junction fitting, and a second clevis into which the clevis of the junction fitting fits, said second clevis comprising branches in which a bore is formed through which the connection pin with the connection fitting passes. Thus, the same connection pins are used to mechanically connect the additional fitting to the connecting rods, to the spreader and to the connection fitting, and to connect the connecting rods to the spreader, the spreader to the junction fitting and the junction fitting to the connection fitting, which simplifies the device according to the invention and reduces its weight.

Reinforcement ribs may be provided between the first clevis and the second clevis of the additional fitting, so that thinner clevises can be used.

The attachment device according to the invention may also comprise a forward engine attachment and an aft engine attachment, the aft engine attachment being distinct from the force take-up device.

Advantageously, at least one tension screw is provided between the junction fitting, the additional fitting and the connection fitting, the pin of which is not parallel to the connection pin, advantageously orthogonal to the connection pin to eliminate instability of the assembly of additional fittings and the junction fitting onto the connection fitting.

Another purpose of this invention is an engine assembly comprising an engine and an engine attachment device, characterised in that said attachment device is a device according to this invention.

Another purpose of this invention is an aircraft comprising at least one engine assembly according to this invention, assembled on a wing or an aft part of the fuselage of this aircraft.

Another purpose of this invention is a method of assembling an aircraft engine on a pylon using an attachment device according to this invention comprising the following steps:
  hoisting the engine fitted with its connecting rods, the spreader, the junction fitting and the additional fitting towards the pylon fitted with the connection fitting,
  making the bores in the connection fitting, the additional fitting and the junction fitting correspond to each other,
  inserting a connection pin transverse to a vertical and longitudinal median plane of the attachment device, into said bores.

Advantageously, the method according to the invention also comprises the junction fitting attachment step onto the connection fitting along a direction not parallel to the connection pin so as to eliminate instability of assembly of additional and junction fittings on the connection fitting.

BRIEF DESCRIPTION OF THE DRAWINGS

This invention will be better understood after reading the following description and the appended drawings in which.

DETAILED PRESENTATION OF PARTICULAR EMBODIMENTS

In the following description, the term "longitudinal" should be considered with respect to the X axis.

Figure 1:
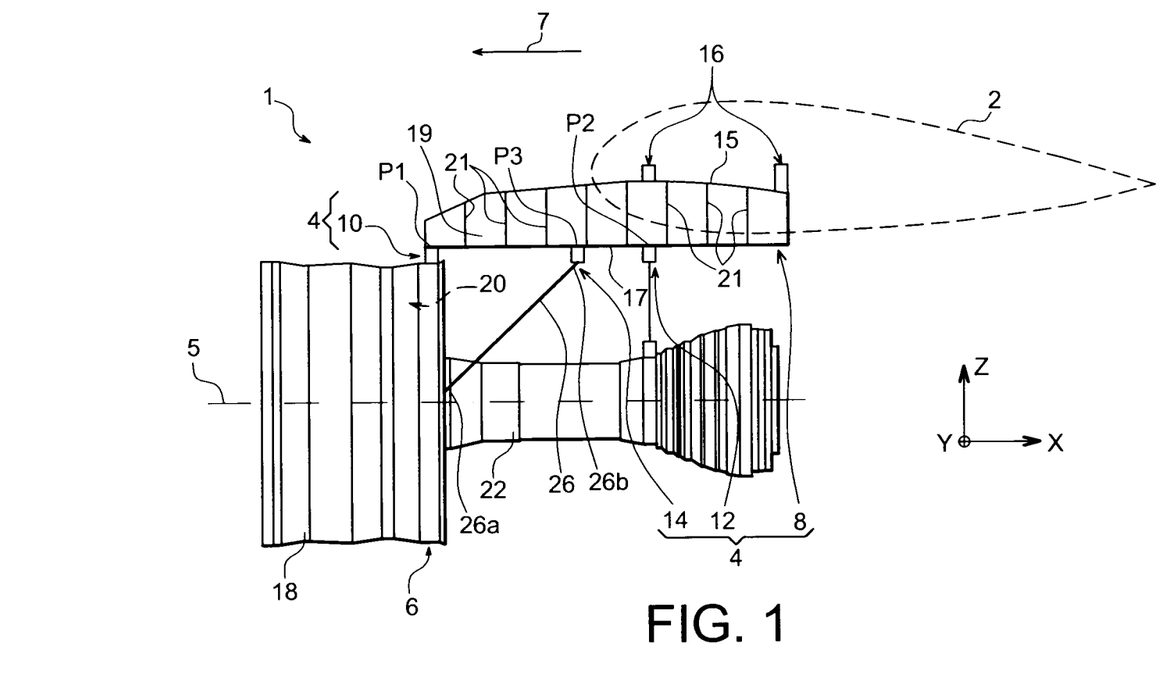
FIG. 1 shows a general diagrammatic side view of an engine assembly for an aircraft comprising an attachment pylon.

FIG. 1 shows an engine assembly 1 for an aircraft designed to be fixed under a wing 2 of this aircraft shown diagrammatically in dashed lines for reasons of clarity, this assembly 1 comprising an attachment device 4 and an engine 6 such as a turbojet attached under this device 4.

Globally, the attachment device 4 comprises a rigid structure 8 carrying attachment means to the engine 6, these attachment means being provided with a plurality of engine attachments 10, 12 and a device 14 to take up thrust forces generated by the engine 6.

For guidance, note that the assembly 1 is designed to be surrounded by a nacelle (not shown) and the attachment device 4 comprises another series of attachments 16 that suspends this assembly 1 under the aircraft wing 2.

Throughout the following description, by convention X refers to the longitudinal direction of the device 4 that is also equivalent to the longitudinal direction of the turbojet 6, this direction X being parallel to a longitudinal axis of this turbojet 6 and of the device 14. Furthermore, Y is the direction transverse to device 4 and also equivalent to the transverse direction of the turbojet 6 and the transverse direction of the device 14, and Z is the vertical direction or the height, these three directions X, Y and Z being orthogonal to each other.

Furthermore, the terms "forward" and "aft" should be considered with respect to the direction of the aircraft encountered under the effect of the thrust generated by the turbojet 6, this direction being shown diagrammatically by the arrow 7.

FIG. 1 shows the two engine attachments 10, 12, the series of attachments 16, the thrust take-up device 14 and the rigid structure 8 of the attachment device 4. The other constituent elements not shown in this device 4, such as the secondary structure that segregates and holds the systems while supporting aerodynamic fairings, are conventional elements that are identical or similar to those encountered in prior art and known to those skilled in the art. Consequently, no detailed description of them will be made.

Furthermore, the turbojet 6 is provided with a large dimension fan casing 16 at the forward end delimiting an annular fan channel 20 and comprises a smaller central casing 22 towards the aft and containing the core of this turbojet.

As can be seen in FIG. 1, there are two engine attachments 10, 12 of the device 4, called the engine forward attachment and the engine aft attachment respectively.

In this example embodiment of this invention, the rigid structure 8 is in the form of a box extending from the aft end to the forward end, approximately along the X direction.

The box 8 is then in the form of a pylon with a design similar to the normal design for turbojet attachment pylons, particularly in the sense that it is made by the assembly of an upper spar 15, a lower spar 17 and two lateral spars/panels 19 (only one is visible due to the side view), these elements 15, 17, 19 being connected to each other through transverse ribs 21, each globally in the form of a rectangle. Thus, the ribs 21 extend in YZ planes, the spars 15, 17 extend approximately in XY planes, and the side panels 19 extend in XZ planes.

The attachment means comprise firstly the forward engine attachment 10 inserted between a forward end of the rigid structure 8 and an upper part of the fan casing 26. However, it would also be possible to have the forward engine attachment 10 fixed onto a connection casing between the central casing and the fan casing, as is known to those skilled in the art. The forward engine attachment 10, designed conventionally and known to those skilled in the art, is fixed at a first point Pi of the rigid structure 8 that is also called the primary structure.

Secondly, the engine aft attachment 12, also made conventionally and known to those skilled in the art, will be inserted between the rigid structure 8 and the central casing 22, and fixed at a second point P2 of the rigid structure 8 placed further aft than point P1. In one preferred example embodiment, the force take-up device 14 is fixed to the box at a third point P3 located between the first point P1 and the second point P2.

Figure 2:
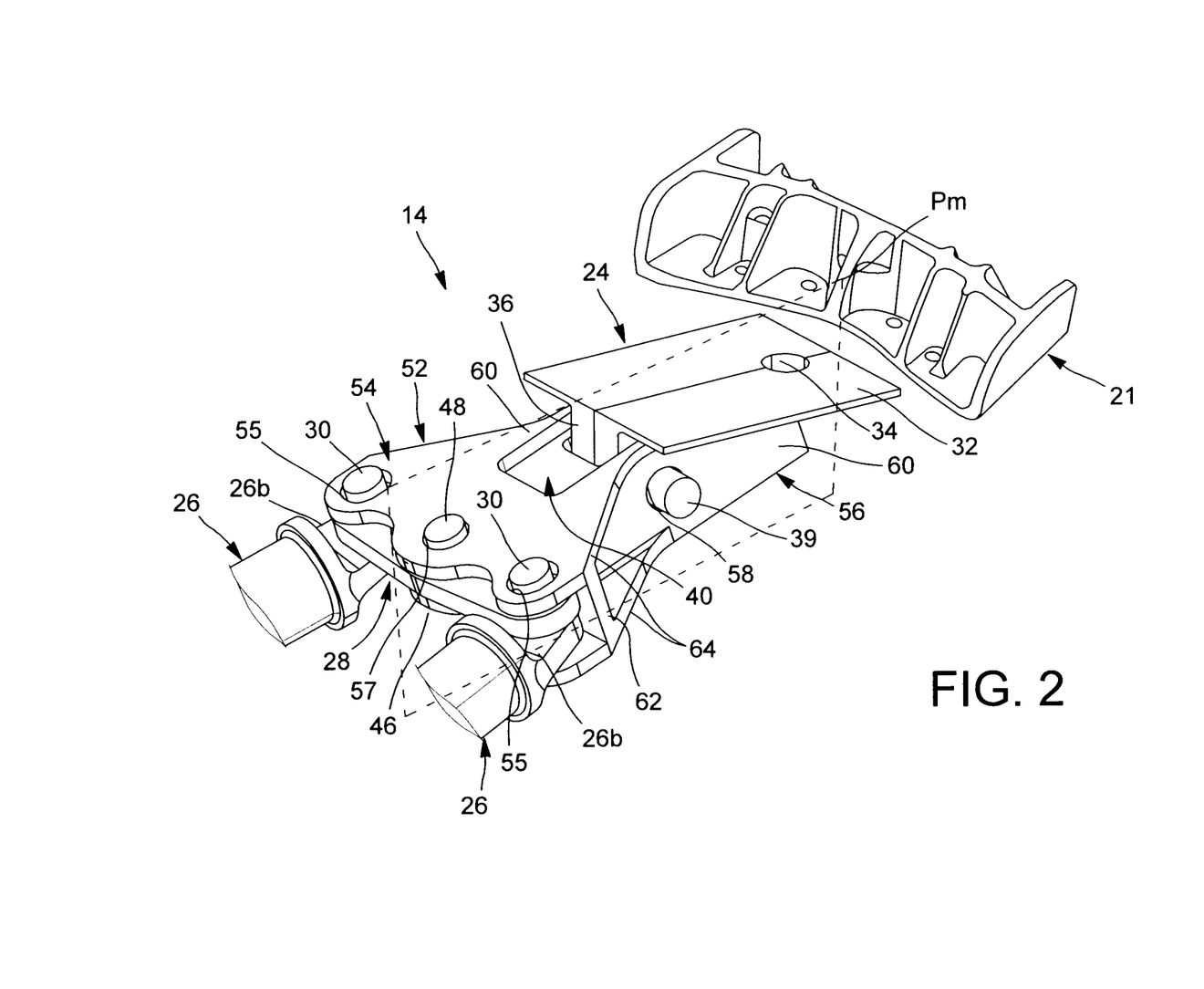
FIG. 2 is a perspective three-quarter view of the top of a force take-up device according to this invention, showing one rib of the pylon to which part of the force take-up device is fixed.
Figure 3:
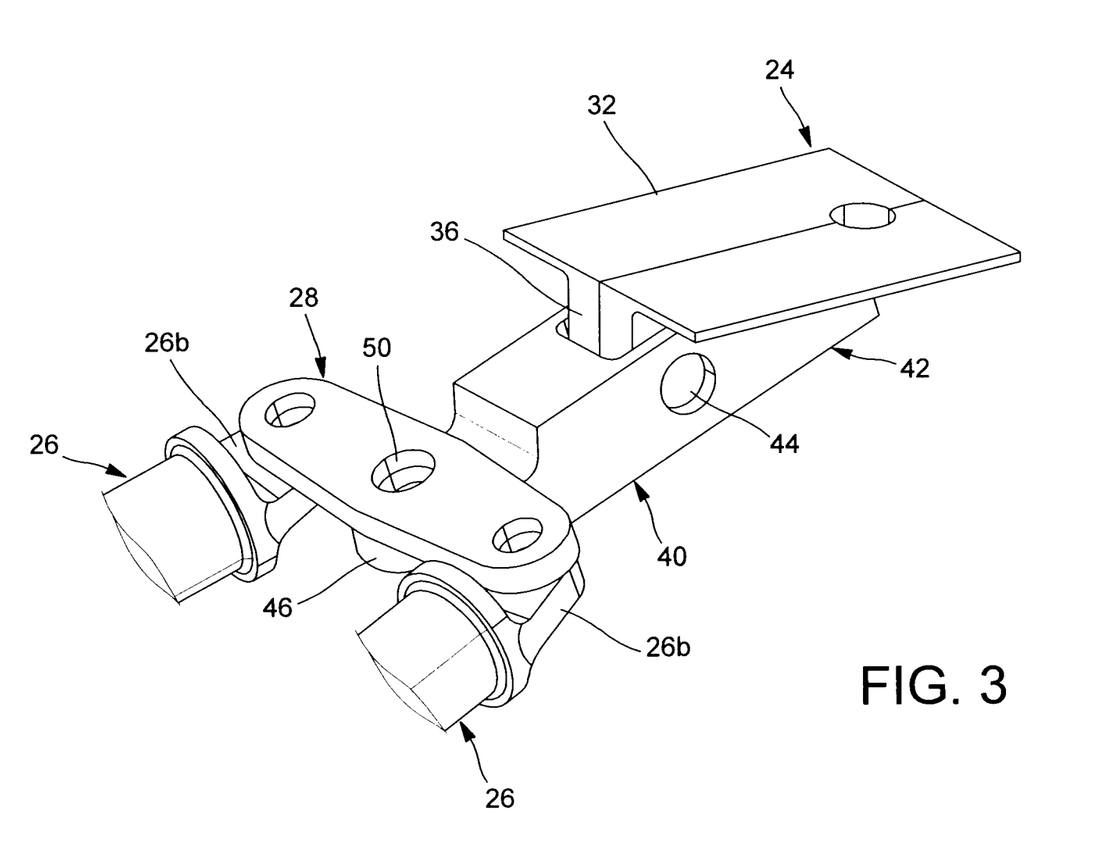
FIG. 3 is a view identical to the view in FIG. 1, the additional fitting performing the fail-safe function being omitted.

In FIG. 2, the detail of the thrust take-up device 14 according to this invention is shown transmitting thrusts from the engine to the box 8 through thrust connecting rods 26 mechanically connected to a spreader 28 by pins 30.

The force take-up device 14 comprises a connection fitting 24 that will be fixed to the lower spar 17 of the box 8, this connection fitting 24 being designed to fix the force take-up device onto the box. This connection fitting 24 comprises a base 32 fixed onto the spar and it comprises a bore 34 for placement of one end of a thrust pin 35 (visible in FIG. 6), the pin 35 penetrating through another end into a transverse rib 21 of the box 8 to transmit thrusts from the connection fitting 24 to the box 8. The thrust pin 35 is mounted approximately vertically.

Figure 6:
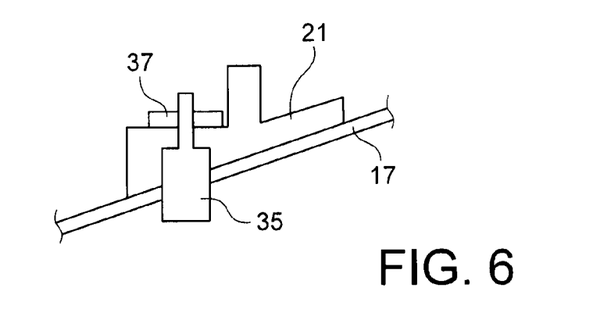
FIG. 6 is a diagrammatic view of an example attachment of a thrust pin on a pylon installed in the force take-up device according to the invention.

FIG. 6 shows a diagrammatic representation of an example attachment of the thrust pin 35 between the connection fitting 24 and the box 8.

The thrust pin 35 between the box 8 and the connection fitting 24 is fixed to the transverse rib 21 and projects downwards from the lower spar 17. The pin is held in place in the fitting by a nut 37.

The plate 32 of the connection fitting 24 is fixed to the lower spar by attachment means, for example six attachment means capable of resisting shear and tension.

Advantageously, the connection fitting 24 is made in two parts 24.1, 24.2 symmetric about the median plane of the force take-up device, to perform fail-safe function if one of them should break.

The connection fitting 24 also comprises a projecting part 36 orthogonal to the base 32 and contained in a longitudinal and vertical median plane Pm of the attachment device.

The projecting part 36 comprises a bore 38 orthogonal to the median plane Pm of the attachment device and into which a pin 39 fits.

The force take-up device also comprises a junction fitting 40 connecting the spreader 28 to the connection fitting 24. The junction fitting 40 comprises a clevis 42 at a first longitudinal end, mounted around the projecting part 36 and comprising a bore 44 in each of the branches of the clevis 42 so that the junction fitting 40 can be fixed to the connection fitting 24 by mounting the pin 39. The pin 39 is mounted laterally in the clevis 42 and the projecting part 36, orthogonal to the median plane Pm.

The junction fitting 40 also comprises a plate 46 at a second longitudinal end contained in a plane orthogonal to the median plane Pm of the attachment device onto which the spreader 28 is mounted using a pin 48 through a bore 49 made in the plate 46 and a bore 50 made in a central part of the spreader 28.

According to this invention, the force take-up device comprises an additional fitting 52 that will perform the fail-safe function. In the example shown, during normal operation the additional fitting covers the force take-up device formed by the aft ends 26b of the connecting rods 26, the spreader 28, the junction fitting 40 and the connection fitting 24.

One longitudinal end of the additional fitting 52 surrounds the spreader and the aft ends 26b of the connecting rods 26, and another longitudinal end surrounds the junction fitting 40.

Figure 4:
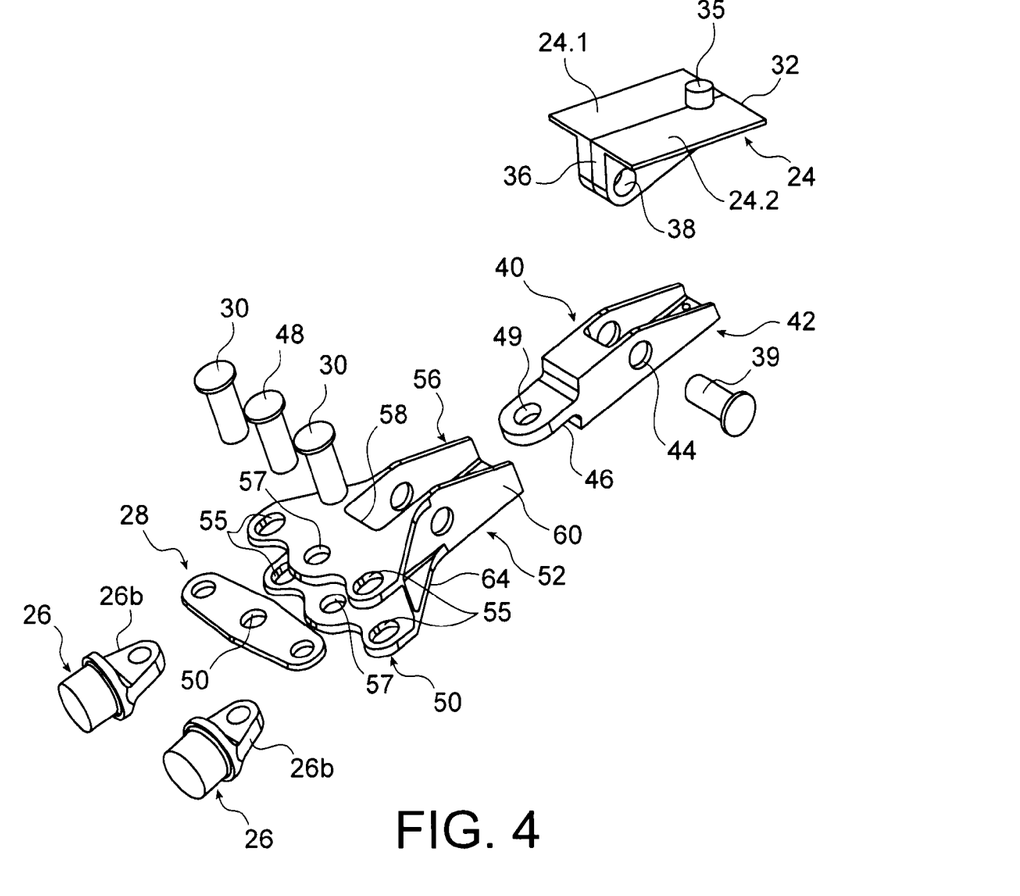
FIG. 4 is an exploded view of the force take-up device in FIG. 1, the pylon rib having been omitted.

The additional fitting 52 comprises a first clevis 54 at its forward end into which the spreader 28 and the aft ends 26b of the connecting rods 26 fit. Each of the branches of the first clevis 54 comprises two bores 55 through which the pins 30 pass and a bore 57 through which the pin 48 passes, the periphery of the ends of the pins 30 and 48 facing the walls of the bores 55, 57 respectively.

Pins 30 are mounted with clearance in the bores 55.

It would be possible to eliminate the bore 57, the pin 48 then having no direct mechanical link with the additional fitting, so that the pin 48 can be shortened and therefore material and mass can be saved.

The device according to this invention uses the same pins to mechanically connect elements resisting forces during normal operation and parts resisting thrusts during degraded operation, therefore the number of parts used is reduced and the mass and cost of the device are also reduced.

Advantageously, the branches of the first clevis 54 have a profile corresponding to bores 54, 57 to reduce the material quantity necessary and therefore the mass of the additional fitting 52, and each branch comprises a profile provided with three swellings at the bores.

The pins 30 are mounted with clearance in the first clevis 54, such that it is not stressed during normal operation, i.e. when the components of the force take-up device are intact.

There is a second clevis 56 at the aft end of the additional fitting 52, which holds the clevis 42 of the junction fitting 40. Bores 58 are formed in this clevis 56 through which the pin 39 passes. The pin 39 is then adjusted in the bores 58 of the H7g6 type.

In the example shown, the branches 60 of the second clevis 56 are orthogonal to a base 58 of the first clevis 54 and parallel to the median plane Pm through which the projecting part 36 of the connection fitting 24 is inserted when the engine is hoisted vertically towards the pylon.

The branches 60 of the second clevis 56 are advantageously connected to the bottom 58 of the first clevis 54 through reinforcement ribs 64, which reduces the thickness and therefore the mass of the bottom 62 and the branches 60, and consequently the mass of the additional fitting 52.

Figure 5:
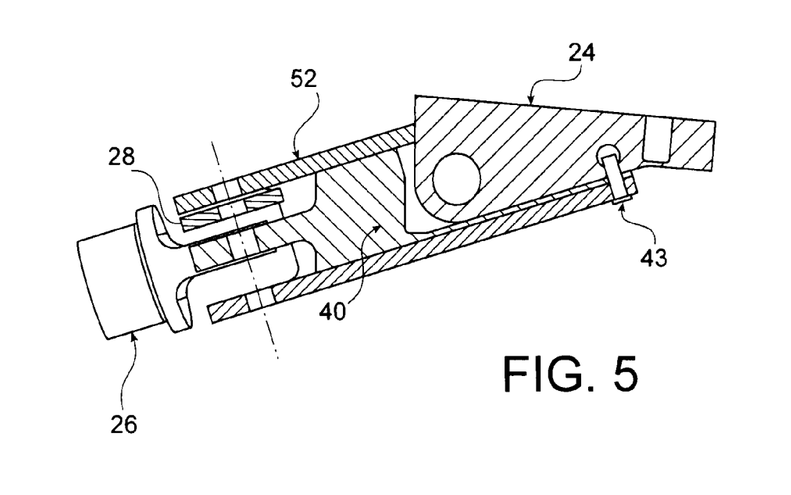
FIG. 5 is a longitudinal sectional view of the force take-up device in FIG. 1 from the pylon side.

Advantageously, as can be seen in FIG. 5, the junction fitting 40 and the additional fitting 52 are fixed to the connection fitting 24 through at least one tension screw 43 associated with a clamping nut. This tension screw 43 has an axis that is not parallel to the axis of the connection pin 39, which is advantageously orthogonal to it, which keeps the junction fitting 40 and the additional fitting 52 in position and eliminates the rotational instability around the pin 39.

We will now describe the paths followed by forces in the different states of the force take-up device.

When the force take-up device 14 is intact, thrusts are transmitted from the connecting rods 26 to the spreader 28 through the pins 30, and then from the spreader 28 to the junction fitting 40 through the pin 48, then from the junction fitting 40 to the connection fitting 24 through the pin 39, then from the connection fitting 24 to the box 48 through the thrust pin.

If one of the connecting rods 26 breaks, the spreader tilts around the pin 48, the pin 30 of the intact connecting rod stops in contact with the bores 58 in the branches of the first clevis 54 of the additional fitting 52. The forces are then transmitted from the intact connecting rod 26 to the connection fitting 24 through the pin 39, via the additional fitting 52.

If the spreader breaks, the two pins 30 stop in contact with the bores 55. The thrusts are then transmitted from the connecting rods 26 to the additional fitting 52 through pins 30 and from the additional fitting 52 to the connection fitting 24 through the pin 39 and from the connection fitting 24 to the box 8 through the thrust pin 35.

The engine thrust take-up device is simple because it only used one part, the additional clevis 52, to make the fail-safe function. This device is also very compact and relatively lightweight compared with devices according to the state of the art. It uses a relatively narrow box 8.

Furthermore, the device according to this invention prevents shocks on the spar, as is the case when stops are provided on the spar and particularly when a connecting rod fails.

Furthermore, the device allows a very simple mounting, because the connection of the engine to the box through the thrust take-up device is made through a single pin inserted through the side that is free. No special tools are then necessary. Advantageously, tension screws could be provided to improve the stability of the assembly.

We will now describe the connection of the engine to the box 8.

The connection fitting 24 is fixed to the lower spar 17 by any appropriate means.

The part of the force take-up device composed of connecting rods 26, the spreader 28, the junction fitting 40 and the additional fitting 52 are fixed to the engine, and particularly the fan casing through the forward ends 26a of the connecting rods 26.

The additional fitting 52 is mounted on the spreader and the junction fitting 40 by inserting the junction fitting 40 into the first clevis 54 of the additional fitting 52 until the first clevis 54 is superposed onto the spreader 28.

The engine, fitted with the part of the thrust take-up device mentioned above is hoisted towards the box 8, the projecting part 36 of the connection fitting 24 is inserted into the clevis 42 of the junction fitting 40 and the pin 39 is introduced laterally. This simple assembly prevents the use of a particular engine placement and removal tooling, as is the case for many devices according to the state of the art.

Advantageously, at least one tension screw can be placed between the junction fitting, the additional fitting and the connection fitting orthogonal to the connection pin 39.

The assembly and disassembly are also facilitated by the easy access to the bores into which the pin 39 fits.

The take-up device 14 is thus capable of taking up forces applied mainly along the longitudinal X direction.

In this way, forces applied along the X longitudinal direction are taken up entirely by the thrust take-up device 14, the forces applied along the Y transverse direction are taken up jointly by the forward attachment 10 and the aft attachment 12, and forces applied along the Z vertical direction are also taken up jointly by the forward attachment 10 and the two half-attachments of the aft attachment 12.

Furthermore, the moment applied about the X direction is taken up only by the two half-attachments of the aft attachment 12, while the moments applied about the Y and Z directions are taken up jointly by these two engine attachments 10, 12.

The invention claimed is:

1. An attachment device for an aircraft engine comprising:
   a rigid structure; and
   attachment means for the engine on the rigid structure, the attachment means including a device to take-up thrust forces generated by the engine, the thrust take-up device including:
   a spreader,
   two connecting rods mechanically connected to the spreader at an aft end through a first mechanical link,
   a connection fitting fixed to the rigid structure to which the spreader is mechanically connected by a junction fitting by a connection pin inserted orthogonal to a vertical and longitudinal median plane of the attachment device, and
   an additional fitting to which the connecting rods, the spreader, and the connection fitting are mechanically connected, a clearance being provided at a second mechanical link between the connecting rods and the additional fitting, a link between the additional fitting and the connection fitting being made using the connection pin connecting the connection fitting and the junction fitting, the connection pin being inserted laterally, orthogonal to the median plane of the attachment device.

2. An attachment device according to claim 1, wherein the junction fitting comprises a plate mechanically connected to the spreader through a connection pin at a first longitudinal end, and a clevis into which the connection fitting will fit at a second longitudinal end.

3. An attachment device according to claim 1, wherein each of the connecting rods is mechanically connected to the spreader through a connection pin, and wherein the additional fitting comprises a first clevis into which the aft ends of the connecting rods and the spreader fit, of which two branches comprise bores to hold the ends of the connection pins connecting the connecting rods to the spreader and the connection pin connecting the spreader to the junction fitting, and a second clevis receiving the clevis of the junction fitting, the second clevis comprising branches in which a bore is formed through which the connection pin with the connection fitting passes.

4. An attachment device according to claim 3, wherein reinforcement ribs are provided between the first clevis and the second clevis of the additional fitting.

5. An attachment device according to claim 1, wherein at least one tension screw is provided between the junction fitting, the additional fitting, and the connection fitting, with an axis that is not parallel to the axis of the connection pin.

6. An attachment device according to claim 1, further comprising a forward engine attachment and an aft engine attachment, the aft engine attachment being distinct from the force take-up device.

7. An engine assembly comprising:
   an engine; and
   an engine attachment device including a rigid structure and attachment means for the engine on the rigid structure, the attachment means including a device to take-up thrust forces generated by the engine, the thrust take-up device including:
   a spreader,
   two connecting rods mechanically connected to the spreader at an aft end through a first mechanical link, a connection fitting fixed to the rigid structure to which the spreader is mechanically connected by a junction fitting by a connection pin inserted orthogonal to a vertical and longitudinal median plane of the attachment device, an additional fitting to which the connecting rods, the spreader and the connection fitting are mechanically connected, a clearance being provided at a second mechanical link between the connecting rods and the additional fitting, a link between the additional fitting and the connection fitting being made using the connection pin connecting the connection fitting and the junction fitting, the connection pin being inserted laterally, orthogonal to the median plane of the attachment device.

8. An aircraft including at least one engine assembly according to claim 7, assembled on a wing or an aft part of the fuselage of the aircraft.

9. A method for assembling an aircraft engine on a pylon using an attachment device including a rigid structure and attachment means for the engine on the rigid structure, the attachment means including a device to take-up thrust forces generated by the engine, the thrust take-up device including:

a spreader, two connecting rods mechanically connected to the spreader at an aft end through a first mechanical link, a connection fitting fixed to the rigid structure to which the spreader is mechanically connected by a junction fitting by a connection pin inserted orthogonal to a vertical and longitudinal median plane of the attachment device, an additional fitting to which the connecting rods, the spreader, and the connection fitting are mechanically connected, a clearance being provided at a second mechanical link between the connecting rods and the additional fitting, a link between the additional fitting and the connection fitting being made using the connection pin connecting the connection fitting and the junction fitting, the connection pin being inserted laterally, orthogonal to the median plane of the attachment device, the method comprising:

hoisting the engine fitted with its connecting rods, the spreader, the junction fitting, and the additional fitting towards the pylon fitted with the connection fitting;

making the bores in the connection fitting, the junction fitting, and the additional fitting correspond to each other; and inserting a connection pin transverse to the vertical and longitudinal median plane of the attachment device, into the bores.

10. A method for assembling an aircraft engine on a pylon according to claim 9 with the junction fitting and further comprising fitting an additional attachment onto the connection fitting along a direction not parallel to the connection pin.

* * * * *